Sept. 1, 1953   G. A. F. WINCKLER ET AL   2,650,946
BATTERY
Filed Feb. 25, 1951

INVENTORS
Gunnar A. F. Winckler
Wilbur H. Rose
Otto K. Reinhardt
BY
Pennie, Edmonds, Morton and Barrows
ATTORNEYS Patented Sept. 1, 1953

2,650,946

UNITED STATES PATENT OFFICE 2,650,946

BATTERY

Gunnar A. F. Winckler, Milford, Wilbur H. Rose, Hamden, and Otto Karl Reinhardt, West Haven, Conn., assignors to Olin Industries, Inc., New Haven, Conn., a corporation of Delaware Application February 25, 1950, Serial No. 146,342

3 Claims. (Cl. 136—111)

1

This invention relates to primary batteries and more particularly to a terminal member for primary batteries of the flat type.

In such batteries, groups of cell elements are assembled in containers or trays which form a plurality of cells with the cathode of each cell in contact with the anode of the adjacent cell. Suitable leads are then connected to the end electrodes, or in the case of the carbon electrode to a metal plate which is in turn in contact with the electrode. In some installations the battery terminals directly engage contact members in the casing of the apparatus or instrument with which it is used, such as a hearing aid device, portable radio or the like.

The present invention is directed to an end terminal that performs several functions. The cap, which may be formed of metal or other suitable material, forms a press-fit over the end of the battery. A spring contact member within the cap engages the terminal of the end cell of the battery and completes a circuit to a terminal formed or mounted in the cap. The spring contact member permits the cap to compensate for variations in the height of the battery. In manufacture, the height of cells will vary slightly and when the battery is to be placed in position between two terminals in an instrument casing, it is sometimes either difficult to get the battery into the casing or to make contact. The press-fit end cap with the spring terminal member permits variation of the overall length of the battery to compensate for this condition.

Another important advantage of the invention is that it protects the end cells from rapid deterioration caused by drying out of the cells. It has been found in practice that the end cells of a stack forming a flat battery dry out more rapidly than the centrally located cells. By the use of end caps of metal or other material impervious to moisture, this disadvantage may be obviated.

The use of the end caps not only provides a battery of improved appearance, but has the further advantage that the end caps may be differently colored to permit clearer differentiation of the positive and negative ends of the battery. Furthermore, the large exposed area of the end cap allows for various types of embossing so that polarity markings may be detected by touch.

In constructing the battery a plurality of cells are assembled in the usual manner with the zinc or other metal electrode exposed at one end of the battery and with the cathode or carbon electrode exposed at the other end of the battery. The end caps, with the spring contact members in them, are then placed on the opposite ends of the battery being press-fitted on to each end

2 of the stack. The caps, with the exception of a raised portion forming the contact or terminal, may be coated with a clear or colored lacquer or other plastic film. It is preferable to employ coatings of contrasting colors for the two end caps to decrease the possibility of upside down insertion of the battery into the instrument case. The caps being retained by press-fit can be adjusted to control the overall battery height. The batteries are then given a spray coating of wax, allowed to age for a period of time and then tested. They may then be suitably labelled.

In the accompanying drawing we have shown two embodiments of the invention. In this showing:

Figure 1:
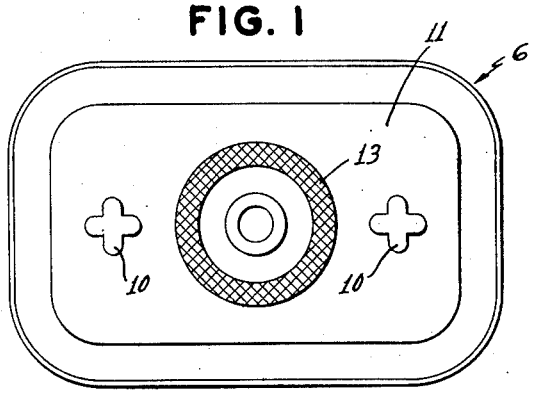
Fig. 1 is a plan view illustrating the embossing of the end cap to indicate polarity.

Referring to Figs. 1 to 3 and 7 of the drawing, the end caps, forming the subject matter of the present invention, are shown in conjunction with a flat type battery of the construction disclosed in the William B. Woodring application Serial No. 656,205, filed March 22, 1946. It will, of course, be obvious that the terminal caps may be employed with any construction of battery and the Woodring battery is used merely for the purpose of illustration. The battery consists of a plurality of trays 1 which are stepped to permit the lower part of each tray to be nested into the upper part of the next lower tray. Each cell consists of an anode 2 which may be formed of zinc, and an absorbent sheet 3 of blotting paper or other fibrous material. The separator is provided with the usual paste coating on the side adjacent the anode and carries the usual electrolyte. A suitably shaped mix cake 4 consisting of the usual depolarizing mix is placed on the separator and a cathode 5 is in contact with the top of the mix cake. The cathode may consist of a strip of cloth or other flexible material impregnated with a carbon paint. Both the cathode and anode may be sealed to the upper and lower sides of the bottom of the tray and to each other by a conductive cement, as disclosed in the Woodring application.

Figure 2:
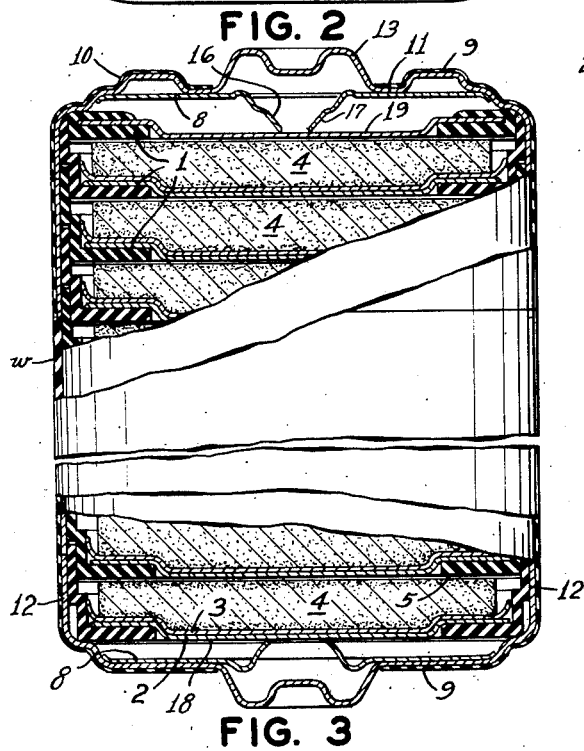
Fig. 2 is a side elevation, parts being shown in section.

A number of these cells, sufficient to give the desired voltage, are assembled into a battery as shown in Fig. 2 of the drawing. End caps 6 and 7 are then placed over the end cells, each of the end caps having a contact member 8 therein as shown in Fig. 2. End caps 6 and 7 are essentially the same in construction except that when they are applied to a battery, they are provided with coatings 9 of lacquer or the like which serve as insulation. The lacquer coatings on the two end caps may be of contrasting colors to more readily indicate the plus and minus terminals of the battery. One of the end caps may also be provided with embossings 10 (see Fig. 1) to indicate polarity and which can be identified by touch if a battery is being placed in an instrument at a point where little light is available.

The end cap is in the form of a cup or pan having a bottom 11 and side walls 12. The end caps shown in Figs. 1 and 3 of the drawing are generally rectangular in shape with rounded corners corresponding to the horizontal cross section of the cells of the battery but it will be apparent that they can be of any shape corresponding to the horizontal cross section of the cells of the battery with which they are used. Each end cap is provided with a central embossing 13 which serves as a terminal. As shown in Fig. 2, the coating 9 extends over the end cap with the exception of the terminal 13. This prevents short-circuiting against other batteries or against a metallic part of the case of the instrument in which the cells are used.

The contact member 8 is placed in the end cap before assembly. As shown, the opposite sides are shaped to form points 14 and the distance between two corresponding points on the opposite side is slightly greater than the corresponding dimension of the bottom of the end cap so that when the contact member 8 is forced into the end cap, it will not be displaced. The center portion 15 of the contact member is cut away to form a pair of tongues 16 and 17, which are bent or offset from the plane of the contact member, as shown in Fig. 2 of the drawing, to engage with the end electrodes of the battery. Instead of directly engaging the end electrodes, the tongues may engage zinc plates 18 and 19 which in turn contact with the end electrodes of the battery.

Figure 7:
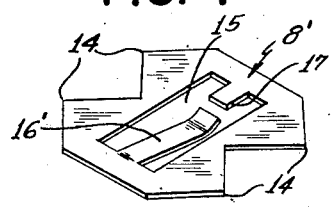
Fig. 7 is a perspective view of another form of the spring plate which is mounted in the end cap to make contact with the end electrode of the battery.

In Fig. 7 we have shown a contact plate 8', in which one tongue 16' is longer than the other tongue 17 and the tongue 16' is bent or offset to engage the end electrode.

The advantages of the construction heretofore described will be readily apparent. In actual practice a press-fit terminal cap has proved to be entirely satisfactory. It will be seen that where the overall height of the battery must be held to certain dimensions to correspond to the distance between a pair of terminals in an instrument case, the caps may be either forced on to the battery as far as they will go or may be positioned with the flanges 12 only partially on the battery, if necessary. After the end caps are in position, the battery is sprayed with wax w between the end caps before the outer paper labels are put on it. If desired, the walls 12 may be provided with prongs to bite into the material of the trays or the caps may be crimped in position.

A distinct advantage of the invention is the elimination of harmful, heat producing soldering operations which are necessary when a terminal lead is connected directly to either the end electrode or a metallic plate in contact with the end electrode.

Figure 4:
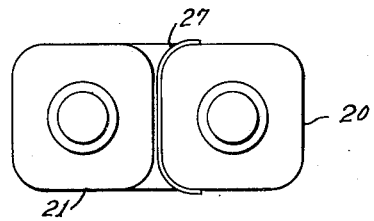
Fig. 4 is a top plan view showing two batteries provided with end caps of the present invention connected in series with the two terminals of the battery at the top.
Figure 5:
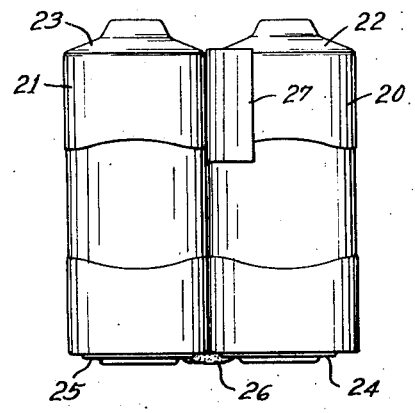
Fig. 5 is a side elevation of the construction shown in Fig. 4.
Figure 6:
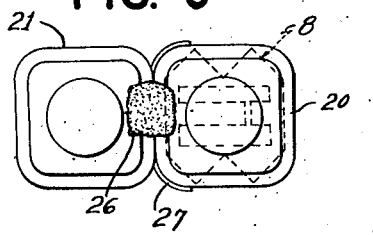
Fig. 6 is a bottom plan view.
Figure 3:
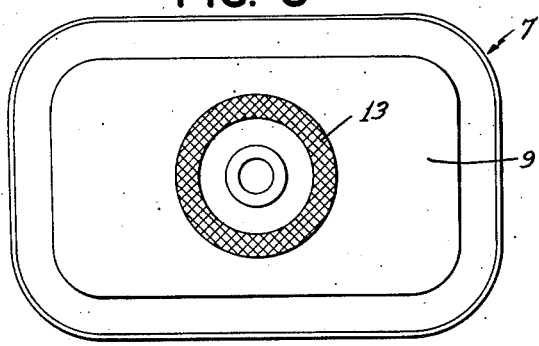
Fig. 3 is a plan view of the other end of the battery showing the other end cap.

Figs. 4 to 6 of the drawing illustrate an advantage of the end caps when two batteries are connected in series with the terminals at the same end. As shown, batteries 20 and 21 are arranged side by side with the negative terminal of one battery, as for example 22, of battery 20 and the positive terminal 23 of battery 21 at the top. In prior constructions it has been necessary to connect the positive terminal 24 of battery 20 and the negative terminal 25 of battery 21 by soldering a wire connected either to the end electrodes or to a metallic plate, such as the plates 18 and 19, in contact with the end electrodes. However, when the end caps of the present invention are employed, the soldering operation indicated at 26 in Fig. 6 of the drawing is all that is necessary to electrically connect these two batteries to each other. As this soldering operation is performed at one side of each of the batteries, it is far less harmful than when a wire or other lead must be soldered to the center portion of each end of the battery. Suitable insulation 27 is then arranged over the side or face of one of the end caps and extended over a portion of each of the two adjacent sides, as indicated in Figs. 5 and 6.

Instead of the embossings 13 to serve as terminal members of the battery, these terminals may be shaped into male and female components of a snap fastener. Then, when it is desired to use two or more batteries in tandem, the snap fastener element on the positive end of one battery could be engaged by the complementary snap fastener element on the other end of the next battery. Instead of shaping the bottom of the terminal cap to form the snap fastener, the bottom could be provided with an opening slightly smaller than the snap fastener element and the snap fastener element secured to the body by riveting or in any other suitable manner. It would then project from the bottom of the cap similarly to the embossing 13 so as to serve as a terminal member when the battery is used alone, but at the same time permit assembly of a plurality of batteries in tandem, if desired.

We claim:

1. A flat type dry cell battery comprising a plurality of substantially flat cell elements arranged in proper order to form a plurality of cells with the anode of each cell in electrical contact with the cathode of the adjacent cell and with electrodes of opposite polarity at opposite ends of the battery, an end terminal member for each end of the battery, each of the end terminal members comprising a cup-like member having side walls engaging the walls of the battery to hold the end terminal member in place and a bottom having a terminal, and a spring contact member in each end terminal member, each spring contact member comprising a substantially flat strip secured against the bottom member of the terminal and having a tongue extending therefrom to engage the end electrode of the battery.

2. A flat type dry cell battery comprising a plurality of substantially flat cell elements arranged in proper order to form a plurality of cells with the anode of each cell in electrical contact with the cathode of the adjacent cell and with electrodes of opposite polarity at opposite ends of the battery, an end terminal member for each end of the battery, each of the end terminal members comprising a cup-like member having side walls engaging the walls of the battery to hold the end terminal member in place and a bottom having a terminal, and a spring contact member in each end terminal member, each spring contact member comprising a substantially flat strip having a tongue extending therefrom to engage the end electrode of the battery, and being provided with means to retain the spring contact member in the end terminal member.

3. A flat type dry cell battery as set forth in claim 1 in which the flat strip of each spring contact member has points at opposite edges embedded in the respective terminal members which hold the strips therein.

GUNNAR A. F. WINCKLER.
     WILBUR H. ROSE.
     OTTO KARL REINHARDT.

References Cited in the file of this patent

UNITED STATES PATENTS

| Number | Name | Date |
|---|---|---|
| 1,182,202 | Parker | May 9, 1916 |
| 1,920,151 | Ruben | July 25, 1933 |
| 2,042,806 | Schulte | June 2, 1936 |
| 2,463,565 | Ruben | Mar. 8, 1949 |
| 2,483,983 | Quinnell | Oct. 4, 1949 |

FOREIGN PATENTS

| Number | Country | Date |
|---|---|---|
| 642,763 | France | Sept. 4, 1928 |
| 771,012 | France | Sept. 28, 1934 |
| 93,158 | Switzerland | Feb. 16, 1932 |